United States Patent [19]

Moore

[11] Patent Number: 4,674,716
[45] Date of Patent: Jun. 23, 1987

[54] BLOWN CRESCENT AIRFOIL

[75] Inventor: William H. Moore, Halesite, N.Y.

[73] Assignee: Grumman Aerospace Corporation, Bethpage, N.Y.

[21] Appl. No.: 696,798

[22] Filed: Mar. 13, 1985

Related U.S. Application Data

[63] Continuation of Ser. No. 543,273, Oct. 19, 1983, abandoned, which is a continuation of Ser. No. 294,448, Aug. 20, 1981, abandoned.

[51] Int. Cl.⁴ .......................... B64C 21/04; B64C 3/50
[52] U.S. Cl. ..................................... 244/207; 244/215
[58] Field of Search ............... 244/207, 210, 211, 212, 244/213, 215, 216, 110 D, 113

[56] References Cited

U.S. PATENT DOCUMENTS

| | | | |
|---|---|---|---|
| 2,034,218 | 3/1936 | Weick et al. | 244/213 |
| 2,974,903 | 3/1961 | Chomarat | 244/207 |
| 3,355,125 | 11/1967 | Allcock | 244/207 |
| 3,974,987 | 8/1976 | Shorr | 244/207 |

Primary Examiner—Trygve M. Blix
Assistant Examiner—Rodney Corl
Attorney, Agent, or Firm—Richard G. Geib; Daniel J. Tick; David Aker

[57] ABSTRACT

A supercritical movable airfoil over which is blown air to obtain a Coanda affect. A sealing strip is provided on a stationary airfoil portion which seals against the movable airfoil portion during blowing to prevent flow of air therebetween.

6 Claims, 4 Drawing Figures

BLOWN CRESCENT AIRFOIL

This application is a continuation of application Ser. No. 543,273, filed Oct. 19, 1983, now abandoned, which, in turn, is a continuation of application Ser. No. 294,448, filed Aug. 20, 1981, now abandoned.

BACKGROUND OF INVENTION

This invention relates to high efficient aerodynamic lifting surfaces. More particularly, this invention relates to airfoils such as trailing edge flaps for wings, which airfoils are configured to encourage flow attachment to the airfoil upper and lower surfaces. This invention also relates to the application of the Coanda effect to such airfoils.

Blown wing flaps have been known as is illustrated and described by U.S. Pat. No. 3,259,341. It has also been the intent of the prior art to teach the blowing over a wing having a crescent cross-sectional profile in accordance with U.S. Pat. No. 4,146,197. None of the skilled in the art have had disclosed to them the concept of applying the advantages of the crescent cross-sectional profile to the art of blown flaps.

SUMMARY OF INVENTION

It is an object of this invention to provide for an airplane movable airfoil a more effective means blowing air thereover in order to minimize engine bleed air requirements thereof and simplify the bleed air system.

It is also an object of this invention use blown air to increase lift over an airplane wing by the simple expedient of using a crescent cross-sectional profile for the movable airfoil.

A more particular object is to use a crescent shaped airfoil that is movable from a position where it is nested with another airfoil such as a wing or stabilizer under a blowing nozzle to provide a large Coanda radius as compared to a small radius of limited length on a conventional thin flap whereby a more effective turning and lift generation can be obtained with a much shorter chord and lower blowing air viscosity for a substantial weight saving for any airplane using this invention in contrast to present known blown flaps as set forth in the background above.

DRAWING DESCRIPTION

DETAILED DESCRIPTION

Figure 1:
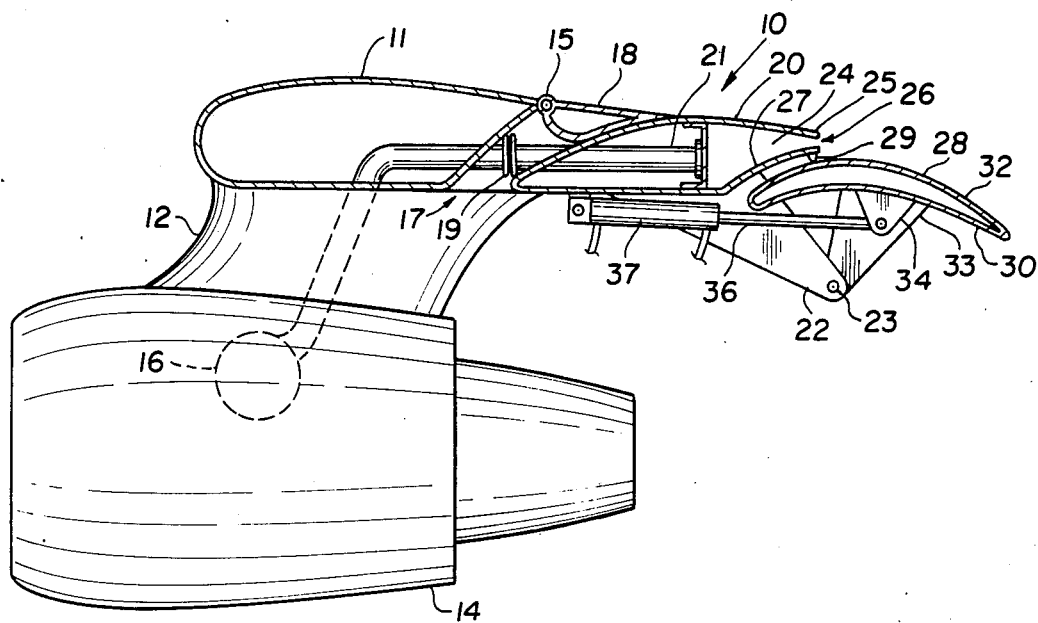
FIG. 1 is a side view of an aircraft wing according to this invention supporting a fan-jet engine.

With particular regard to FIG. 1 there is shown an airplane wing 10 to which is mounted by a pylon 12 a jet engine 14. Shown in phantom is an air bleed 16 from the jet engine 14 through the pylon 12 to the wing 10.

The wing 10 is a two part structure constructed to pivotally carry a flaperon 18 for airplane roll control adjacent the upper surface of a first portion 11; and a second portion 20 extending aft from a point under the flaperon 18 so as to define a slot 17 from the wing undersurface to the upper controlled by flaperon 18. The usual actuator means readily familiar to one skilled in the art are housed in the wing to bring about the movement of flaperon 18 that will permit pivotal motion thereof about hinge 15. A hinge fairing 22 attached to the undersurface of the wing 10 carries a pivot axis 23.

As is sketched the bleed air system includes flexible bellows type communication 19 between first portion 11 and second portion 20 of wing 10 to a duct 21 opening to a trailing edge chamber 24. A nozzle slot 26 is formed at the trailing edge of along the upper surface profile for stationary structure 20 to exhaust bleed air rearwardly of wing 10.

The sheet metal panels 25 and 27 of the second portion 20 of wing 10 about the chamber 24 are such as to permit the movement of the lower panel 27 downwardly upon bleed air pressurization of chamber 24. A trailing edge flap 28 is pivoted on an axis 23 from a hinge fairing 22 to normally be under the curved plate 27 to limit the downward flexing of plate 27 under pressure from chamber 24. A frictionless seal strip 29, i.e., of a teflon material will by compression limit the movement of the panel 27.

Figure 2:
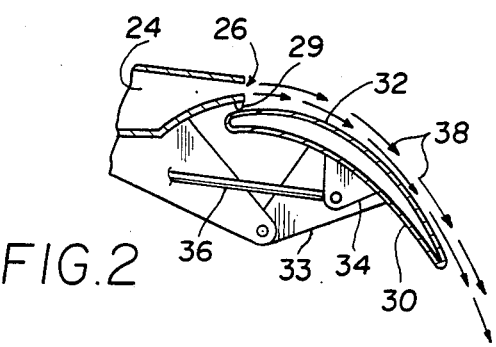
FIG. 2 is a partial cross-section of the trailing edge of the wing of FIG. 1 with the crescent flap moved.
Figure 3:
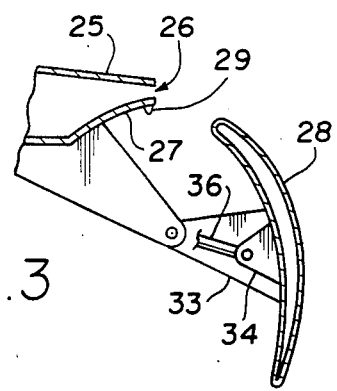
FIG. 3 is a partial cross-section of the trailing edge of the wing with the crescent flap moved to its speed-brake position.
Figure 4:
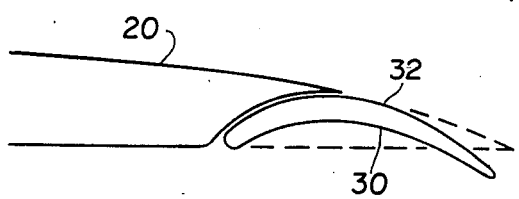
FIG. 4 is an outline schematic of the trailing edge of a stabilizer or wing with a crescent shape movable airfoil in full line and a conventional profile for the prior art movable airfoil in dash lines superimposed.

Flap 28 has a convex upper surface profile 32 and a concave lower surface profile 30 to appear as a crescent shaped airfoil in a side-view (See FIGS. 2, 3 and 4). The device 28 has a pivot horn 33 and an actuator horn 34 with which rod 36 is connected leading from the actuator mechanism 37 so as to rotate the device 28 from the cruise position of FIG. 1 to the high-lift position of FIG. 2 about pivot axis 23. In the nested and rotated position (see FIGS. 1 and 2) the air (See arrows 38) from the nozzle 26 will provide a Coanda effect over the convex upper surface 32.

With the flap 28 in the retracted or cruise (nested) position, shown in FIG. 1, the potential exists to improve the performance of the entire wing airfoil section 10 during the aircraft cruise mode in flight by blowing a very small amount of bleed air from the nozzle 26 over the upper surface of flap 28. This could increase list and decrease drag by encouraging the ambient airflow to adhere to the upper and lower surfaces of flap 28, since the velocity of the air exiting the nozzle will be greater than the local air velocity over the airfoil section 10.

This airflow operation utilizes the Coanda effect to a more limited degree in cruise than in the high lift mode with the flap 28 rotated.

Small gains in the cruise mode may pay off since the aircraft flies in the cruise mode a lot longer than it does in the high lift mode, for takeoffs and landings.

The actuator mechanism is such that it will permit downward separation from the second portion 20 of wing 10 of the flap 28 to the speed brake position shown by FIG. 3 when, for example the airplane has landed and reverse thrust or braking action has been desired by the pilot.

It is to be appreciated that the concave curvature of the undersurface will encourage air flow in all attitudes of flap 28 to adhere to the undersurface and thereby assist in pulling air along convex upper surface. A comparison of the structural profile of flap 28 of this invention with that familiar to the prior art (see dash lines) is seen in FIG. 4.

Having set forth an operative construction of this invention above it is now desired to claim same by these Letters Patent as follows:

1. In an airfoil having a stationary portion and a movable portion, said stationary portion of said airfoil comprising a wing having an upper surface, an undersurface and a trailing edge and said movable portion of said airfoil comprising an upper surface of convex curvature in cross-sectional profile and a lower surface of concave curvature in cross-sectional profile, a device for increasing performance and saving weight in said airfoil, said device comprising a bleed air system for supplying pressurized air to the stationary portion of said airfoil;

an air chamber in said stationary portion for receiving said pressurized air, said air chamber having an upper panel and a substantially flexible lower panel movable downwardly away from said upper panel upon bleed air pressurization of said chamber and a nozzle for the exhaust of pressurized air in said chamber;

a crescent-shaped airfoil constituting the movable portion of said airfoil pivotally connected to said stationary portion in a manner whereby said crescent-shaped airfoil underlies said lower panel of said chamber; and an essentially frictionless seal strip extending outwardly from said lower panel of said chamber and abutting said crescent-shaped airfoil to prevent airflow from the undersurface of said airfoil to between said stationary portion and said crescent-shaped airfoil upon bleed air pressurization of said air chamber, said seal extending from said undersurface of said wing and limiting movement of said undersurface in a predetermined area of said undersurface.

2. An airfoil as claimed in claim 1, further comprising mounting means mounting said movable portion of said airfoil to nest within the trailing edge of said wing whereby in the nested position said movable portion of said airfoil lies under said trailing edge and is positioned as a chordal extension of said wing.

3. An airfoil as claimed in claim 1, wherein said nozzle extends along a predetermined span of said trailing edge to exhaust said fluid over the upper surface of said movable portion of said airfoil.

4. An airfoil as claimed in claim 1, further comprising actuator means connected to said crescent-shaped airfoil for moving said crescent-shaped airfoil from its nested position with said stationary portion to a normal attitude therewith to provide a speed brake.

5. An airfoil as claimed in claim 1, wherein said stationary portion of said airfoil includes a slotted area from said undersurface to said upper surface and a flaperon for controlling the opening of said slotted area at said upper surface.

6. An airfoil as claimed in claim 2, wherein said mounting means permits said movable portion of said airfoil to assume any number of positions from generally aligned with said wing to normal thereto.

* * * * *